No. 702,059. Patented June 10, 1902.
J. F. HATHAWAY.
VEHICLE.
(Application filed Oct. 26, 1901.)
(No Model.) 2 Sheets—Sheet 1.

WITNESSES: INVENTOR:

THE NORRIS PETERS CO., PHOTO-LITHO., WASHINGTON, D. C.

UNITED STATES PATENT OFFICE.

JAMES F. HATHAWAY, OF SOMERVILLE, MASSACHUSETTS.

VEHICLE.

SPECIFICATION forming part of Letters Patent No. 702,059, dated June 10, 1902.

Application filed October 26, 1901. Serial No. 80,050. (No model.)

*To all whom it may concern:*

Be it known that I, JAMES F. HATHAWAY, of Somerville, in the county of Middlesex and State of Massachusetts, have invented a new and useful Improvement in Vehicles, of which the following is a specification.

Various means have been adopted for the purpose of adding an additional seat to a vehicle—that is to say, of making a vehicle having one seat into a two-seated vehicle or a two-seated vehicle into a three-seated vehicle, &c. As an illustration of the means adopted for this purpose prior to my invention I would call attention to a convenient style of vehicle-body known to the trade as the "New Stanley," which comprises a permanent seat, in front of which is a seat which may be brought into use or not, as desired. When in use, this front seat has a hinged front door or panel which lets down and is held in place by chains in order to allow the person sitting on the front seat a place for his feet. This arrangement, however, has been found unpleasant, as there is no provision for a dasher and, more especially in rapid going, the person using the seat appears to have no protection whatsoever in front. Moreover, the foot-space is very limited, there being scarcely more than is found on the ordinary express-wagon.

My invention consists in a vehicle extension of reasonable size, which may have as part thereof a dashboard, so as to give to the user of the vehicle as much space as he has in the front seat of an ordinary carriage, this extension being detachable from the vehicle-body and so arranged in connection therewith as to be easily removed and easily put in place and so arranged also that when in place it may appear to be part of the original construction of the vehicle.

I have shown my invention applied to a New Stanley of the type above referred to; but it is evident that it may be equally well applied to a vehicle-body of any other construction so far as the combination of extension and vehicle-body is concerned, my invention relating not to the shape of the extension nor to the kind of vehicle to which it is attached, but to the detachable structure, which may, in fact, be used to form an addition to the floor-space of the vehicle either as a footboard or for any other purpose.

My invention will be understood by reference to the drawings, in which—

Figure 1:
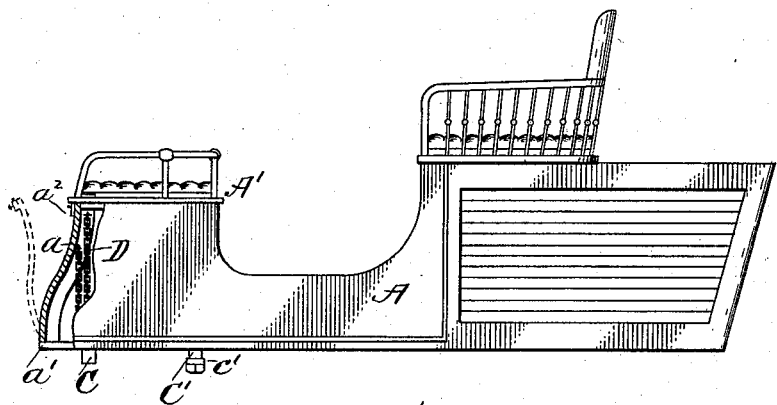
Figure 2:
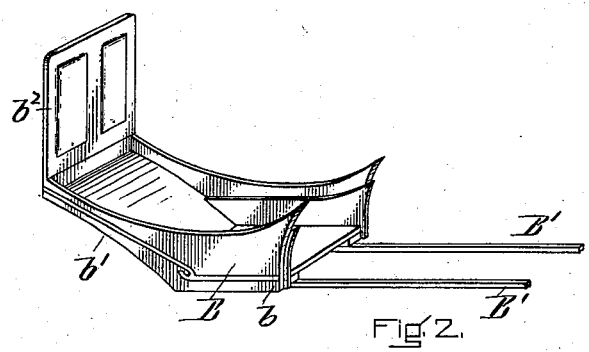
Figure 3:
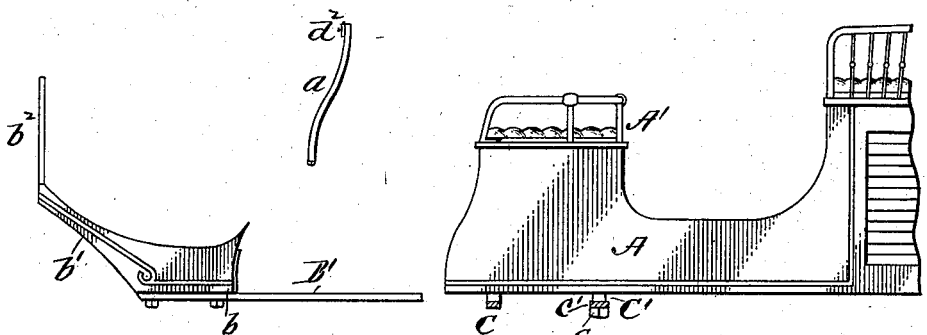
Figure 4:
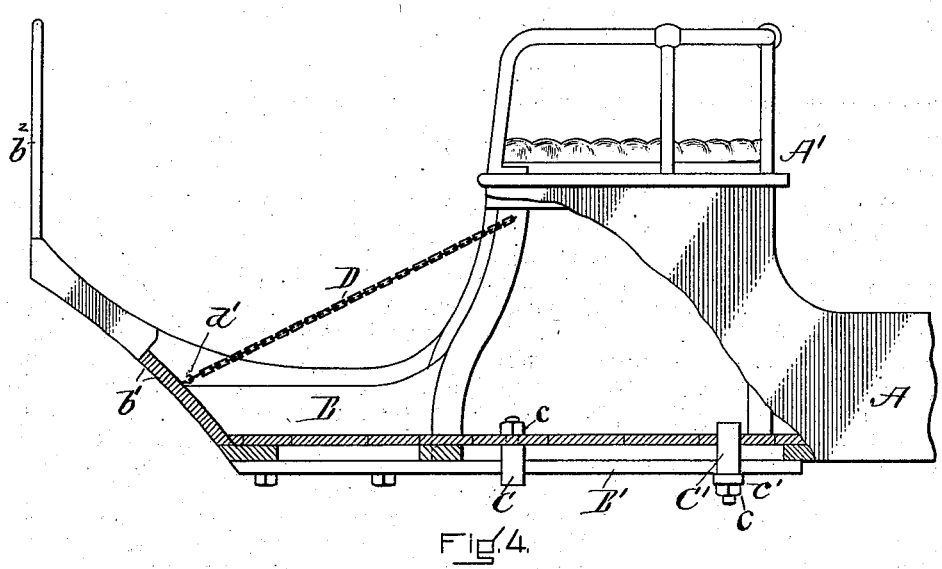
Figure 5:
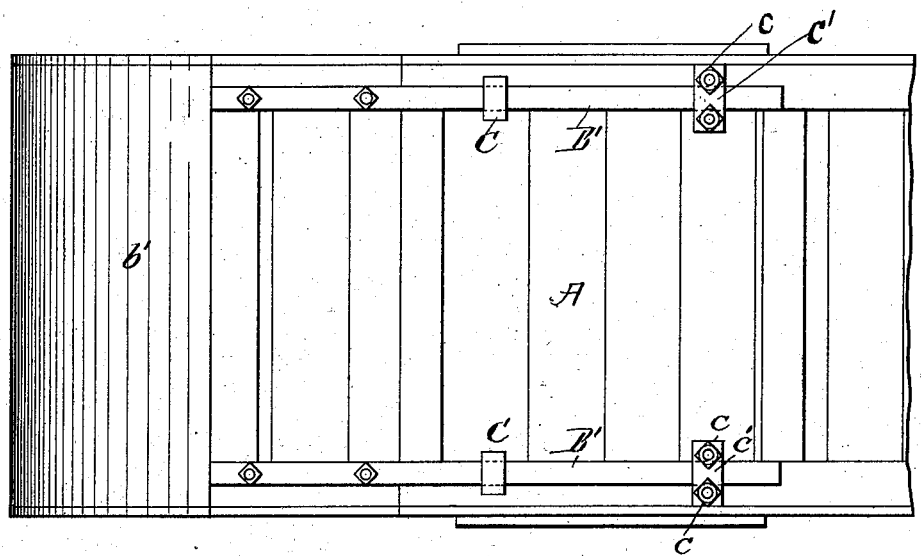

Figure 1 shows a New Stanley carriage-body without my extension in side elevation, a portion being in section. Fig. 2 shows a perspective view of the extension as used with this type of vehicle. Fig. 3 shows a portion of the carriage-body, extension, and the front door or panel all detached, Fig. 4 being a side elevation, partly in section, of the front seat with an extension constructed according to my invention attached thereto, and Fig. 5 an under view showing a means of attachment.

A is the carriage-body, A' being the front seat thereof. In the type of carriage referred to the front seat is ordinarily made in the form of a box which may be used for storage.

$a$ is what I have termed a "front door"—namely, a front panel hinged at $a'$ and closing at its upper edge against the carriage-body, being locked in place by means of a suitable latch $a^2$. This front door or panel $a$ is attached to the carriage-body by means of hinges, which may be of any well-known character, preferably such as will enable the front door to be easily removed from the carriage-body when in an open position.

B is the detachable extension, which may be of any convenient shape. I have shown it provided with a horizontal floor $b$, having a slanting projection therefrom, $b'$, which carries at its outer end the dashboard $b^2$, this being a useful as well as a tasteful form of construction; but I do not mean to limit myself to any specific form of detachable extension. To attach this extension to the vehicle-body, I prefer to provide two bars B' upon the under side of this extension, each projecting rearwardly for a considerable distance and each adapted to slide into two or more staples projecting from the under side of the carriage-body. Such staples I have shown at C C', their free ends being threaded, so that they may be held in place by nuts $c$. I prefer to reverse one of these staples C', in which case a yoke-piece $c'$, with two holes to slip over the free ends of the staple, is provided, to be held in place by the nuts $c$.

D is a chain such as is ordinarily used to support the outer edge of the front door or panel a when that door is dropped into a horizontal position, as may often be necessary when it is desired to reach the contents of the box under the seat A'. In a vehicle of the New Stanley type two of these chains are used, one being permanently attached to each side of the carriage-body, and they then support the free edge of the panel against the weight of the passenger. I utilize these same chains to assist in supporting the extension, detaching their lower ends from the door and hooking them to hooks d near the outer edge of the extension.

In practice when it is desired to change the vehicle in question from a single-seated vehicle to a double-seated vehicle the box-front a is first let down, the chains D unhooked from it, and the door itself disengaged from the carriage-body A. The detachable extension is then slid into place, the bars B' sliding into the staples C C', respectively, and the nuts c are then tightened up, so as to bind the bars closely under the body of the carriage. The free ends of the chains D are then hooked to the hooks d. The extension is then in place and the carriage is ready to be used.

By arranging the design of the vehicle-body in relation thereto the detachable extension when in place may be so carefully adjusted that the joint between it and the vehicle-body will form a portion of the ornamentation of the vehicle, and yet it may be easily detached, taking but a few minutes for this purpose, so that the vehicle will become a one-seated vehicle, the front door a being put in place and closing up the front opening to the box under the front seat and the front seat becoming merely the top of the storage-box.

It will be evident to any one skilled in the art that the shape and mode of attacement of such an extension to a vehicle-body may be varied in many ways and that vehicle-bodies of other well-known designs may be easily adapted to have such an extension attached to them without departing from the spirit of my invention, which consists in a detachable extension capable of easy and ready attachment in order to enlarge the carrying capacity of the vehicle-body, whether this vehicle-body be designed to be drawn by horses or to be used upon some automobile-truck.

What I claim as my invention is—

A vehicle-body having a permanent seat located on the front edge thereof and facing to the front, provided with a detachable front door, in combination with a detachable extension adapted to form a footboard for said front seat, and means for temporarily attaching said extension to said vehicle-body, whereby said extension may be used to make said front seat available, said front door being removed or said extension being removed, said front door may be utilized to close and form a finish to the front of the vehicle, as described.

In testimony whereof I hereunto set my name this 22d day of October, 1901.

JAMES F. HATHAWAY.

Witnesses:
GEORGE O. G. COALE,
M. E. FLAHERTY.